United States Patent [19]

Lyon

[11] Patent Number: 4,657,752

[45] Date of Patent: Apr. 14, 1987

[54] PROCESS FOR PREPARING FERROUS CARBONATE

[75] Inventor: William G. Lyon, Bartlesville, Okla.

[73] Assignee: Phillips Petroleum Company, Bartlesville, Okla.

[21] Appl. No.: 723,974

[22] Filed: Apr. 16, 1985

[51] Int. Cl.$^4$ ............................................. C01B 31/24
[52] U.S. Cl. ................................. 423/419 R; 423/144; 423/632
[58] Field of Search ........... 423/140, 141, 144, 419 R, 423/594, 632

[56] References Cited

U.S. PATENT DOCUMENTS

| | | | |
|---|---|---|---|
| 1,547,624 | 7/1925 | Smith et al. | 423/419 |
| 2,845,332 | 7/1958 | Allison et al. | 423/419 |
| 3,156,644 | 11/1964 | Kunin | 423/419 R |
| 3,350,167 | 10/1967 | McMullen et al. | 423/419 |
| 3,416,883 | 12/1968 | Gould | 423/419 |
| 3,424,574 | 1/1969 | Irani | 15/53 |
| 3,896,049 | 7/1975 | Dworak | 252/466 |
| 3,946,103 | 3/1976 | Hund | 423/663 |
| 4,018,875 | 4/1977 | Jordan | 423/419 R |
| 4,497,785 | 2/1985 | Tilley et al. | 423/419 R |

FOREIGN PATENT DOCUMENTS

| | | | |
|---|---|---|---|
| 0007465 | of 1899 | United Kingdom | 423/419 R |
| 2081602 | 2/1982 | United Kingdom | 423/419 R |

OTHER PUBLICATIONS

French, Bevan M. "Stability Relations of Siderite (FeCO$_3$) In The System Fe-C-O," *American Journal of Science*, vol. 271 (Jun. 1971), pp. 37–78.
Ehrhardt, Von H. "Hochdrucksynthesen Einiger Carbonate mit Überkritischem CO$_2$," *Z. Anorg. Allg. Chem*, 462 (1980), pp. 185–198.
Smith, H. J. "On Equilibrium in the System: Ferrous Carbonate, Carbon Dioxide and Water," *JACS*, 40 (1918), pp. 879–883.
Ok, Hang Nam, "Relaxation Effects in Antiferromagnetic Ferrous Carbonate," *Physical Review*, vol. 185, No. 2 (Sep. 10, 1969), pp. 472–476.
Waldeck, W. F. et al., "Aqueous Solubility of Salts at High Temperatures, The Ternary System Na$_2$CO$_3$-NaHCO$_3$-H$_2$O from 100° to 200°," *JACS*, 56 (1934), pp. 43–47.
Nebergall, W. H. et al., *College Chemistry*, Lexington, Mass., D. C. Heath and Company, 1968, p. 880.
Ray, James D. et al., "Use of Reactive Iron Oxide to Remove H$_2$S from Drilling Fluid," Society of Petroleum Engineers of AIME, SPE 7498 (1978), pp. 1–4.

*Primary Examiner*—Andrew H. Metz
*Assistant Examiner*—Anthony McFarlane
*Attorney, Agent, or Firm*—William R. Sharp

[57] ABSTRACT

A process for the production of ferrous carbonate is provided wherein a mixture of an alkali metal bicarbonate and a ferrous compound such as a ferrous salt in solution is heated to a temperature in the range of about 100° C. to about 300° C. for a sufficient time to allow a precipitate to form. A molar ratio of alkali metal bicarbonate to ferrous compound is at least 2:1, such a ratio giving an extremely pure precipitate of ferrous carbonate.

9 Claims, 3 Drawing Figures

PROCESS FOR PREPARING FERROUS CARBONATE

This invention relates to a process for the preparation of relatively pure samples of ferrous carbonate.

Ferrous carbonate ($FeCO_3$) is a convenient source of the ferrous ion since the carbonate anions can be easily removed from a final product by heating. Therefore, ferrous carbonate has potential industrial and commercial significance in processes requiring a source of the ferrous ion. For example, ferrous carbonate is potentially useful for the addition of iron ions to ceramics such as those used in computer memory cores. Similar use is made of $CoCO_3$, $NiCO_3$ and $MnCO_3$. The oxide alternative to $FeCO_3$, "FeO", is refractory, non-stoichiometric and unavailable. Similarly, mixtures of Fe and $Fe_2O_3$, while useable and available, are expensive and must be protected from oxidation even at room temperature. Another potential use for ferrous carbonate which has industrial significance is in processes for making ferrous catalyst materials, such as $\alpha$-$FeMoO_4$, wherein ferrous carbonate could be used as the starting reagent.

It also envisioned that ferrous carbonate could also find application in petroleum drilling fluids as a scavenger for $H_2S$, a toxic hazard in many drilling operations. Similar use is made of zinc carbonate. One of the by-products of reacting ferrous carbonate with $H_2S$ is the disulfide of iron. Production of such a by-product would make ferrous carbonate a more efficient scavenger than zinc carbonate.

Extremely pure (i.e. 98-99% purity) samples of ferrous carbonate are very useful as reference standards in Mössbauer spectrometry studies of the naturally occurring mineral siderite, which consists of primarily ferrous carbonate but with small amounts of dissolved calcium, manganese and magnesium ions.

Several methods for producing ferrous carbonate are known, each of which suffers from disadvantages such as impractical expense or production of a highly impure and unuseable product.

The simplest process for producing ferrous carbonate involves reacting a ferrous salt such as ferrous sulfate ($FeSO_4$) with a basic solution such as sodium carbonate ($Na_2CO_3$) at room temperature and pressure. This process is quite inexpensive and simple to carry out, but produces a highly impure product containing various amorphous by-products which oxidize easily in air to yield rusts, for example. In view of the instability of such a ferrous carbonate product in air, the product must be stored in special air-tight containers which of course is expensive and impractical. Moreover, such an impure product is limited in its usefulness in various processes since the identity and amount of the impurities are not known and are not practically ascertainable.

Another process for making ferrous carbonate involves the decomposition of ferrous oxalate dihydrate ($FeC_2O_4.2H_2O$) at high temperature (i.e. 380° C.) and pressure (i.e. 2000 bars). This process results in a relatively pure product. However, the extreme temperature and pressure conditions required are an obvious disadvantage in view of the consequent need for special equipment to operate under such conditions. Additionally, ferrous oxalate is not readily available and is expensive.

Yet another process for ferrous carbonate production employs ammonium carbonate (($NH_4)_2CO_3$) and anhydrous ferrous chloride which react to yield a fairly pure product of ferrous carbonate. This process has little commercial potential due to the unavailability of ammonium carbonate in good purity and due to the extreme expense of anhydrous ferrous chloride. Ferrous chloride and other ferrous salts are most typically available in hydrated form.

Still another ferrous carbonate production process involves mixing sodium bicarbonate ($NaHCO_3$) and ferrous sulfate in solution in a high pressure (i.e. 200 atm) $CO_2$ atmosphere and at an elevated temperature (i.e. 160° C.). This process also produces a relatively pure product of ferrous carbonate, but requires an expensive external pressurized source of $CO_2$ and associated pressure control equipment.

SUMMARY OF THE INVENTION

It is, therefore, an object of the present invention to provide a process of making ferrous carbonate.

It is also an object of the present invention to provide a process for producing a highly pure ferrous carbonate product which is stable in air.

It is a further object of the invention to provide a ferrous carbonate production process which is relatively simple and inexpensive.

The above objects are realized in a process which is carried out in a sealed vessel, wherein a mixture of a ferrous compound and an alkali metal bicarbonate in solution is heated at a temperature in the range of about 100° C. to about 300° C., wherein the ferrous compound is capable of reacting in solution with the alkali metal bicarbonate to produce ferrous carbonate. Further in accordance with the invention, the mole ratio of alkali metal bicarbonate to the ferrous compound is at least about 2:1. The solution is heated a sufficient time to allow the formation of a precipitate, the precipitate being a highly pure product of ferrous carbonate.

The above described process is simple to carry out and also relatively inexpensive, especially when the presently preferred reactants, ferrous chloride and sodium bicarbonate, are employed. Furthermore, the process of the present invention produces a highly pure product. The alkali metal bicarbonate tends to decompose so as to yield $CO_2$ as a by-product, and the mole ratio of alkali metal bicarbonate to ferrous compound provides for production of $CO_2$ in sufficient amounts to effectively suppress a side reaction, having ferrous carbonate as a reactant, wherein unstable amorphous by-products are formed. Therefore, no external source of $CO_2$ is necessary, in contrast to the last mentioned prior art process discussed above.

DESCRIPTION OF THE PREFERRED EMBODIMENTS

Figure 1:
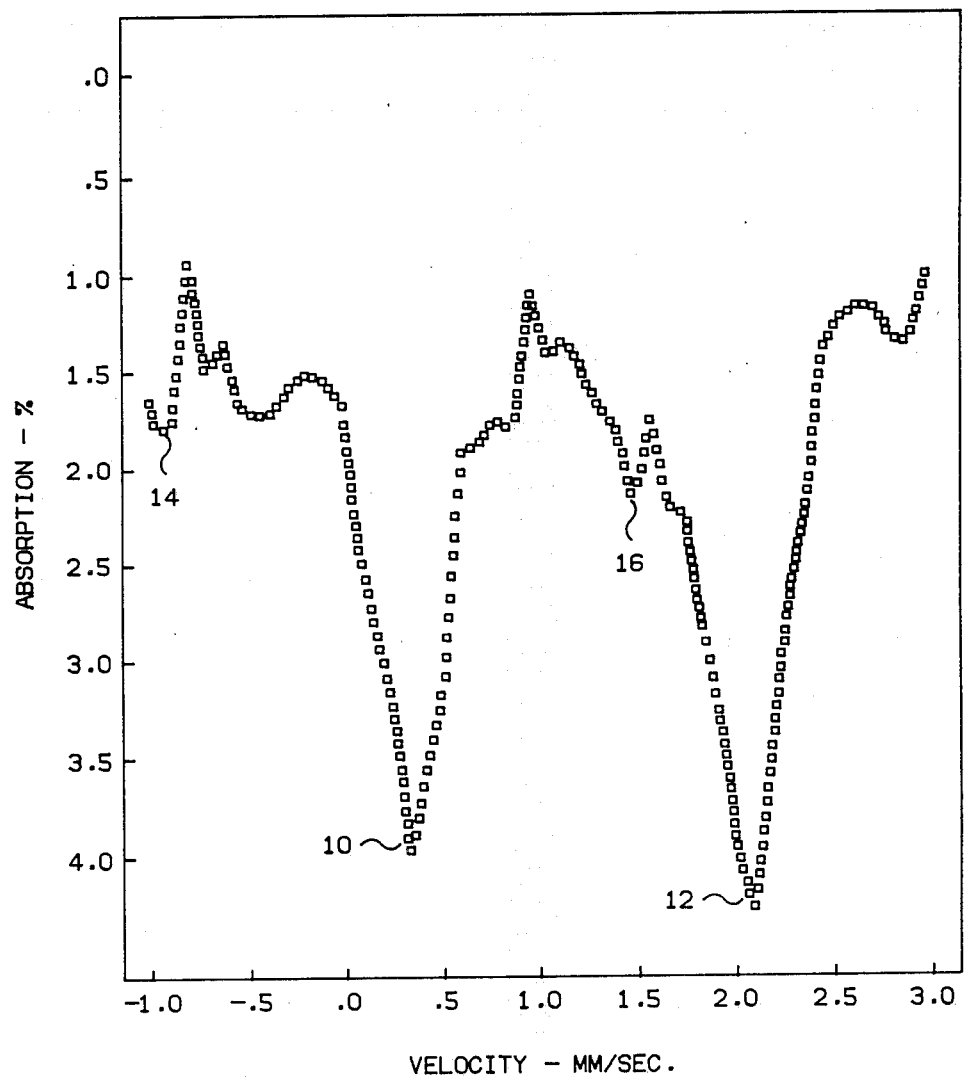
FIG. 1 is a Mössbauer spectrum plot of velocity versus absorption for a sample of ferrous carbonate produced according to a first example.

In accordance with the present invention, there is provided a process, which is carried out in a sealed vessel, for preparing a highly pure ferrous carbonate product which comprises heating a mixture of an alkali metal bicarbonate and a ferrous compound in solution at a temperature in the range of about 100° C. to 300° C. for a sufficient time to allow the formation of a precipitate. The molar ratio of alkali metal bicarbonate to the ferrous compound is at least about 2:1.

Alkali metal bicarbonates useful in the practice of the present invention can be defined by the general formula $XHCO_3$, wherein X is an alkali metal such as Na, K or Li from Group I of the Periodic Table. Sodium bicarbonate ($NaHCO_3$) is the presently preferred alkali metal bicarbonate, primarily because it is inexpensive and widely available.

The ferrous compound for use in the present invention should be soluble in the solvent employed to an extent necessary to carry out the reactions efficiently and, as noted above, capable of reacting with the alkali metal bicarbonate to form ferrous carbonate. As used herein and as is known by those skilled in the art, the term "ferrous" denotes the presence of iron having an oxidation state of 2. Preferred ferrous compounds suitable for practice of the invention include ferrous salts. Such ferrous salts include, for example, ferrous dihalides such as $FeCl_2$, $FeBr_2$, and $FeI_2$. Other suitable ferrous salts are ferrous sulfate ($FeSO_4$), ferrous ammonium sulfate ($Fe(NH_4)_2(SO_4)_2$) and ferrous acetate $Fe(C_2H_3O_2)_2$. The preferred ferrous compound is ferrous chloride ($FeCl_2$) because of its ready availability, low expense, and excellent solubility in most solvents, especially water. It should also be understood that the above described ferrous compounds are most typically employed in hydrated form.

The process of the present invention is preferably carried out in a sealed reaction vessel due to the production of $CO_2$ during the process, and the desirability of utilizing the $CO_2$ thus produced to suppress undesirable side reactions which will be discussed in detail below. The alkali metal bicarbonate and ferrous compound reagents may be placed in solution in the reaction vessel in any convenient manner. For example, each reagent may be dissolved in separate volumes of solvent so as to result in two separate solutions, wherein the two solutions are then mixed in the reaction vessel. Alternatively, solvent may be placed in the reaction vessel followed by adding of the reagents. It is also preferred that the reaction vessel be evacuated and filled with an inert gas to atmospheric pressure. This inert atmosphere is desirable because of the instability of certain ferrous compounds useable with the invention, ferrous chloride in particular.

The preferred solvent for use in the present process is water such that the reagents are in aqueous solution. However, other solvents such as certain alcohols could conceivably be employed providing the reagents are sufficiently soluble therein.

With respect to molar ratios, the molar ratio of alkali metal bicarbonate to the ferrous compound is at least about 2:1, more preferably in the range of about 3:1 to about 10:1. The significance of these molar ratios with respect to the effective suppression of the above-mentioned side reactions will become more apparent below with reference to a discussion of the reactions which occur during the process. With respect to the referred molar ratio range given, excellent results in the form of a pure product have been obtained when the reaction was carried out within this range. In addition, a molar ratio within this preferred range is clearly in excess of the ratio of 2:1 so as to provide most consistent results in actual practice, although some alkali metal bicarbonate may precipitate out during the reaction. This is not really a disadvantage, however, in view of the low expense of the preferred alkali metal bicarbonate, sodium bicarbonate. It should also be noted that the molar ratio employed is somewhat temperature dependent due to the fact that the impurity producing side reactions are increasingly difficult to suppress as temperature is increased.

The temperature at which the solution is maintained throughout the process is, as already noted, in the range of about 100° C. to about 300° C. The temperature employed is preferably no less than about 100° C. because at temperatures below this level the decomposition of the alkali metal bicarbonate usually does not occur to an appreciable extent. The decomposition of the alkali metal bicarbonate is essential for ferrous carbonate to be formed and for $CO_2$ to be produced. It is advantageous to heat the solution to as high a temperature as possible since the crystallinity of the final ferrous carbonate product improves with increasing temperature. A high degree of crystallinity in the final product is generally associated with an insensitivity to oxygen, and is therefore desirable. As indicated above, however, increasing the temperature of reaction enhances the side reactions to an unpredictable extent so as to impose an upper temperature limit, above which the side reactions can no longer be effectively controlled.

With respect to the duration of the process, the solution is heated for a sufficient time to allow a precipitate to be formed, the precipitate being a relatively pure product of ferrous carbonate. Total process times ranging from 16 hours to 70 hours have been successfully implemented. It should be understood, however, that these time values are given only for additional guidance, and that the process could be carried out for a time less than or more than these values depending on many factors such as temperature, amounts of reagents employed, etc.

Preferably, the solution is stirred or agitated during the process to achieve maximum contacting of reagents.

Several important reactions, as presently understood, which occur during the process of the invention will now be set forth. For the sake of illustration, the alkali metal bicarbonate will be assumed to be $NaHCO_3$ and the ferrous compound will be assumed to be $FeCl_2$, which is most conveniently in hydrated form.

The $NaHCO_3$ decomposes as given below:

$$2NaHCO_3(aq.) \rightarrow Na_2CO_3(aq.) + CO_2(g) + H_2O(l). \quad (1)$$

A product of this reaction, sodium carbonate or $Na_2CO_3$, reacts with $FeCl_2$ to form $FeCO_3$ as follows:

$$FeCl_2(aq.) + Na_2CO_3(aq.) \rightarrow FeCO_3(c) + 2NaCl(aq.) \quad (2)$$

Of course, in actuality, the reactants in this reaction ionize in solution such that a ferrous ion combines with a carbonate ($CO_3^{=}$) ion to form $FeCO_3$.

An important side reaction involves the hydrolysis of $FeCO_3$ to yield unstable ferrous hydroxide which is easily oxidizable in air, and of course is an undesired impurity. This reaction is an equilibrium reaction, wherein $$FeCO_3(c) + H_2O \rightleftharpoons Fe(OH)_2(c) + CO_2(g). \quad (3)$$

This hydrolysis reaction tends to occur even where water is not used as the solvent since the ferrous compound utilized is almost always in hydrated form.

In another side reaction, the Fe(OH)$_2$ produced by reaction (3) decomposes at temperatures above about 120° C. to form another impurity, magnetite (Fe$_3$O$_4$), as follows:

$$3Fe(OH)_2(c) \rightarrow Fe_3O_4(c) + H_2(g) + 2H_2O(l). \qquad (4)$$

It should be apparent from equations (1) and (2) that a sodium bicarbonate to ferrous chloride molar ratio of 2:1 is stoichiometric. That is, at this molar ratio all of the FeCl$_2$ is used up to form FeCO$_3$.

Most importantly, a product of reaction (1) can be seen to be CO$_2$. Production of CO$_2$ from this reaction tends to drive reaction (3) to the left and therefore suppress this reaction (and also reaction (4) indirectly) and consequent production of impurities. It has been found that a molar ratio of at least about 2:1, the stoichiometric ratio, is needed to suppress these reactions to an appreciable degree.

Therefore, the alkali metal bicarbonate acts as an inexpensive in situ source of CO$_2$ for suppressing impurity producing side reactions. This is considered to be a considerable improvement over techniques requiring an external source of CO$_2$.

The precipitate formed according to the invention is typically allowed to at least partially settle, the precipitate then being separated by any conventional technique such as decanting or filtering followed by water washing to remove any excess alkali metal compounds. Optionally, the precipitate could be allowed to remain in the reaction vessel for a period of time after completion of the process. This will tend to improve the crystallinity of the final product.

Several examples are described below to further illustrate the invention, but should not be construed to limit the invention in any manner. Some preliminary information believed to be appropriate at this point will be set forth, however, before the examples are described.

Mössbauer spectra were obtained in each example using a conventional Mössbauer spectrometer with an electromechanical drive system. The source used with the spectrometer was 50 millicurie cobalt 57 diffused into palladium foil. 14 keV gamma ray emission was used in the examples. In addition, both sample and source were kept at room temperature. As is well known to those skilled in the art, Mössbauer spectrometry involves irradiating a sample under study with gamma rays. The source of the gamma rays typically produces electromagnetic energy at a single frequency. Thus, the sample can be irradiated at different frequencies by moving the source relative to the sample at different velocities so as to shift the frequency to varying degrees according to the Doppler effect. Absorption of gamma rays by the sample can therefore be measured for different frequencies (corresponding to different source velocities) by utilizing a suitable detector. In interpretation of Mössbauer spectra obtained for ferrous carbonate samples, it is known to those skilled in the art that two separated and well defined troughs in the spectrum correspond to the presence of ferrous iron. Generally, troughs having equal amplitudes and areas, thus being symmetrical, indicate pure ferrous iron. Narrow trough width is also indicative of purity of the sample with respect to ferrous iron. In addition, two values, called quadrupole splitting and isomer shift, are calculated for each example. Quadrupole splitting is calculated from the horizontal distance between the two troughs referred to above, wherein the spectrum is plotted employing a vertical axis corresponding to % absorption and a horizontal axis corresponding to source velocity. The isomer shift can be generally defined as the distance from the 0 point on the horizontal axis to the point centered between the troughs; isomer shifts reported herein are relative to alpha iron. Generally, as the concentration of impurity ions substituted for iron increases, the quadrupole splitting changes.

Additionally, the ferrous chloride used in the examples is hydrated. Further, the ferrous chloride employed was a mixture of FeCl$_2$.2H$_2$O and FeCl$_2$.4H$_2$O. Molar ratios will be given as ranges, with the lower limit corresponding to a calculation of the ratio with FeCl$_2$.2H$_2$O, and the upper limit corresponding to calculation of the ratio with FeCl$_2$.4H$_2$O.

EXAMPLE I

A first solution was prepared by mixing 8.4 grams (~0.1 mol) of sodium bicarbonate (NaHCO$_3$) with 100 mL of degassed distilled water in a volumetric flask under the protection of an inert atmosphere inside a glove box. In a similar manner, a second solution was prepared by mixing 19.9 grams (~0.1 mol–0.12 mol, the upper and lower limits corresponding to FeCl$_2$.4H$_2$O and FeCl$_2$.2H$_2$O respectively) of ferrous chloride with 100 mL of degassed distilled water. The ferrous chloride solution was cleaned by passing the solution through a Jones reductor (a mercury coated zinc column) three times. 100 mL of the sodium bicarbonate solution was then mixed with 50 mL of the ferrous chloride solution to give a sodium bicarbonate to ferrous chloride molar ratio of 1.64:1 to 2.00:1, the lower and upper limits corresponding to the different hydrated forms of ferrous chloride as explained above. The resultant 150 mL solution was placed in a Parr mini reactor vessel (a 300 mL capacity model 4561 available from Parr Instrument Co. of Moline, Ill. being glass lined with furnace, temperature control and stirrer). The reactor was appropriately sealed and set at a temperature of 200° C. The stirrer was set to operate at 600 rpm. The reactor was maintained at these conditions for 70 hours and a bluish gray precipitate resulted. The precipitate sample was then transferred to a helium purged glove box for filtering and washing. The precipitate was first washed with degassed distilled water and then rinsed with ethanol to dryness.

A Mössbauer spectrum for the resulting sample was obtained and is shown in FIG. 1, wherein velocity is plotted versus % absorption. Prominent troughs as shown at 10 and 12 indicate the presence of ferrous iron in the form of ferrous carbonate. However, it can be seen that the troughs have different amplitudes and are generally unsymmetrical which indicates the presence of impurities in addition to ferrous carbonate. Furthermore, extraneous irregularities as shown at 14 and 16 indicate the presence of some impurities like magnetite. No quadrupole splitting or isomer shift was obtained from the spectrum.

EXAMPLE II 13 grams (~0.15 mole) of sodium bicarbonate was added to 150 mL of degassed distilled water using a similar procedure as in the first example. An additional 50 mL of water was added to result in a 200 mL solution. A ferrous chloride solution was prepared as in Example I. 150 mL of the sodium bicarbonate solution was mixed with 50 mL of ferrous chloride solution to give a sodium bicarbonate to ferrous chloride molar ratio of 1.90:1 to 2.32:1. The resultant solution was placed in the reaction vessel and heated at 200° C. for 16 hours during which the solution was stirred. A white precipitate residue resulted from the reaction which was cleaned as described in Example I.

Figure 2:
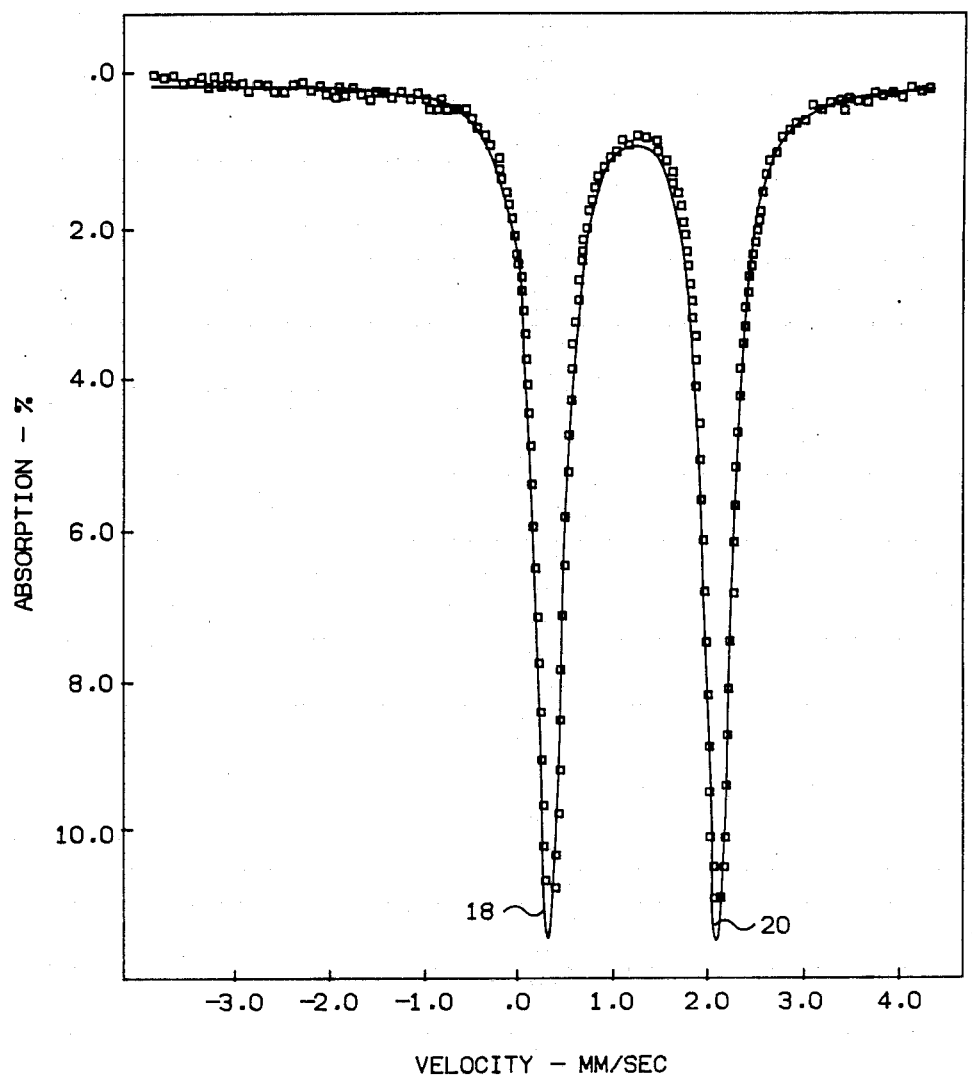
FIG. 2 is a Mössbauer spectrum plot for a ferrous carbonate sample prepared in accordance with a second example.

FIG. 2 shows a Mössbauer spectrum obtained for the Example 2 precipitate. A curve, as shown, has been fitted to the plotted points. Troughs shown at 18 and 20 can be seen to be of substantially equal amplitude, highly symmetrical, and relatively narrow in width. All of these characteristics indicate a highly pure ferrous carbonate sample. Furthermore, the curve can be seen to be very smooth and free of extraneous peaks and troughs, a further indication of extreme purity. The spectrum gives a quadrupole split of 1.77 and an isomer shift of 1.21. Furthermore, this sample exhibited no color change when exposed to air.

An x-ray diffractogram of $FeCO_3$ corresponding to the Mössbauer spectrum of FIG. 2 showed only lines corresponding to $FeCO_3$ (calcite type structure) and agreed well with lines given on card 8–133 of the Powder Diffraction File (Joint Committee on Powder Diffraction Standards, Swarthmore, Pa.). No lines were detected for $NaHCO_3$ or the various hydration forms of $Na_2CO_3$; thus the efficiency of the water-washing procedure for removing these excess alkali metal compounds is demonstrated.

EXAMPLE III

Using the same procedure as described in Example I, a solution of sodium bicarbonate was prepared with 36 grams (~0.43 mol) of sodium bicarbonate and 100 mL of water, and a ferrous chloride solution like that in Examples I and II was also prepared. 100 mL of the sodium bicarbonate solution was mixed with 50 mL of the ferrous chloride solution to give a sodium bicarbonate to ferrous chloride molar ratio of about 7.01:1 to 8.56:1. The resultant solution was heated as in Examples I and II to a temperature of 200° C. for about 24 hours during which the solution was stirred. A precipitate having a pale cream color was produced. An accumulation of clear crystals in the vessel were determined to be sodium bicarbonate crystals precipitated out during the process.

Figure 3:
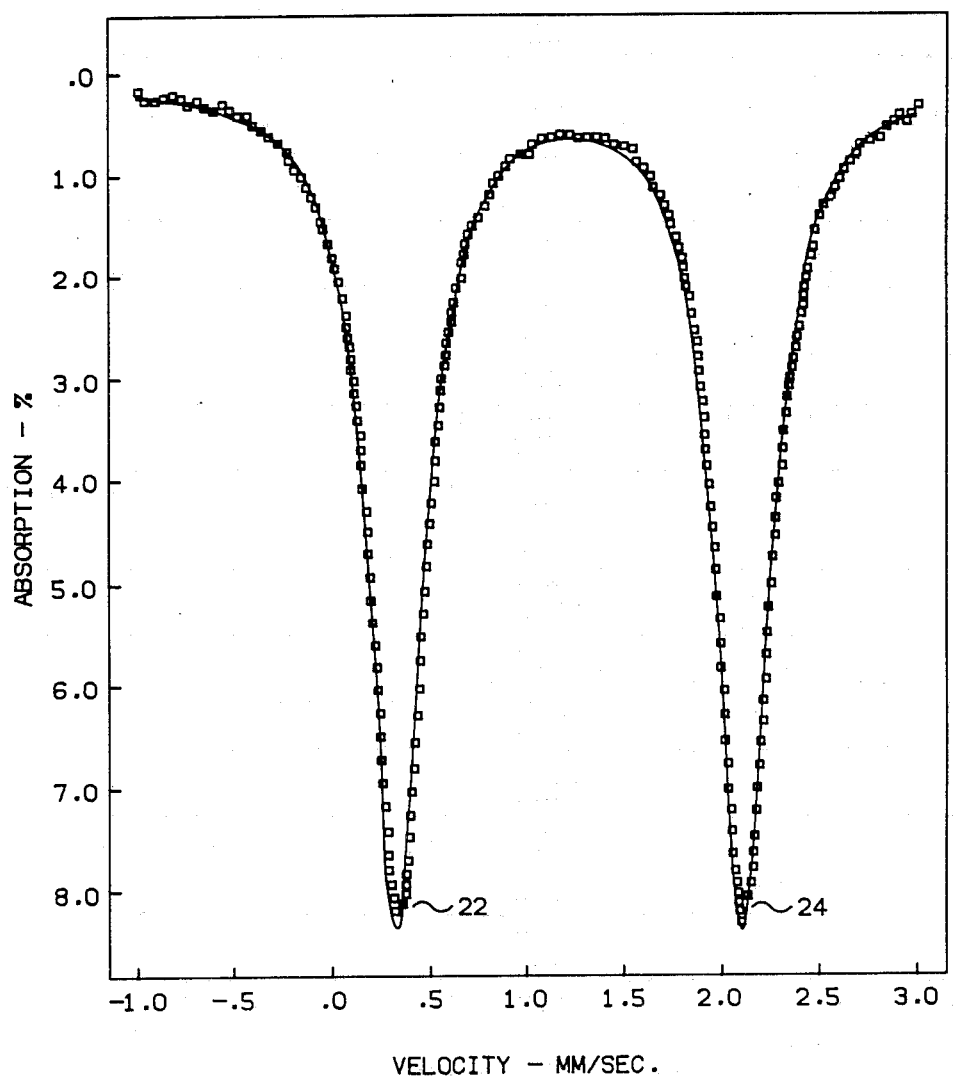
FIG. 3 is a Mössbauer spectrum plot for a ferrous carbonate sample made according to a third example.

Referring to FIG. 3, a Mössbauer spectrum for the resulting precipitate is shown. The highly symmetrical troughs as shown at 22 and 24, and the lack of extraneous peaks and troughs tend to indicate a very pure sample of ferrous carbonate. The spectrum gives a quadrupole split of 1.78 and an isomer shift of 1.22.

Obviously many modifications and variations of the present invention are possible in light of the above teachings. It is therefore to be understood that within the scope of the appended claims the invention may be practiced otherwise than as specifically described.

That which is claimed is:

1. A process for making ferrous carbonate, said process being carried out in a sealed vessel, wherein said process comprises:
    (a) heating a mixture of an alkali metal bicarbonate having the formula $XHCO_3$, where X is an alkali metal, and a ferrous compound in solution at a temperature in the range of about 100° C. to about 300° C. for a sufficient time to allow the formation of a precipitate, wherein said ferrous compound is capable of reacting in solution with said alkali metal bicarbonate to produce ferrous carbonate, and wherein the mole ratio of alkali metal bicarbonate to ferrous compound is at least 2:1;
    (b) separating said precipitate from said solution;
    (c) washing said precipitate, the thus washed precipitate being ferrous carbonate of at least about 98% purity.

2. A process as recited in claim 1, wherein the mole ratio of said alkali metal bicarbonate to ferrous compound is in the range of about 3:1 to about 10:1.

3. A process as recited in claim 1, wherein said ferrous compound is a ferrous salt.

4. A process as recited in claim 3, wherein said ferrous compound is ferrous chloride.

5. A process as recited in claim 1, wherein said alkali metal bicarbonate comprises sodium bicarbonate.

6. A process as recited in claim 1, wherein said solution is an aqueous solution.

7. A process as recited in claim 6, wherein said process is carried out at about 200° C.

8. A process as recited in claim 1, wherein said vessel contains an inert gas.

9. A process as recited in claim 1, wherein in step (c) said precipitate is washed with water.

* * * * *